June 30, 1931. P. B. CAMP 1,812,256
BRAKE SLACK ADJUSTER FOR RAILWAY CARS
Filed Jan. 17, 1929 2 Sheets-Sheet 1
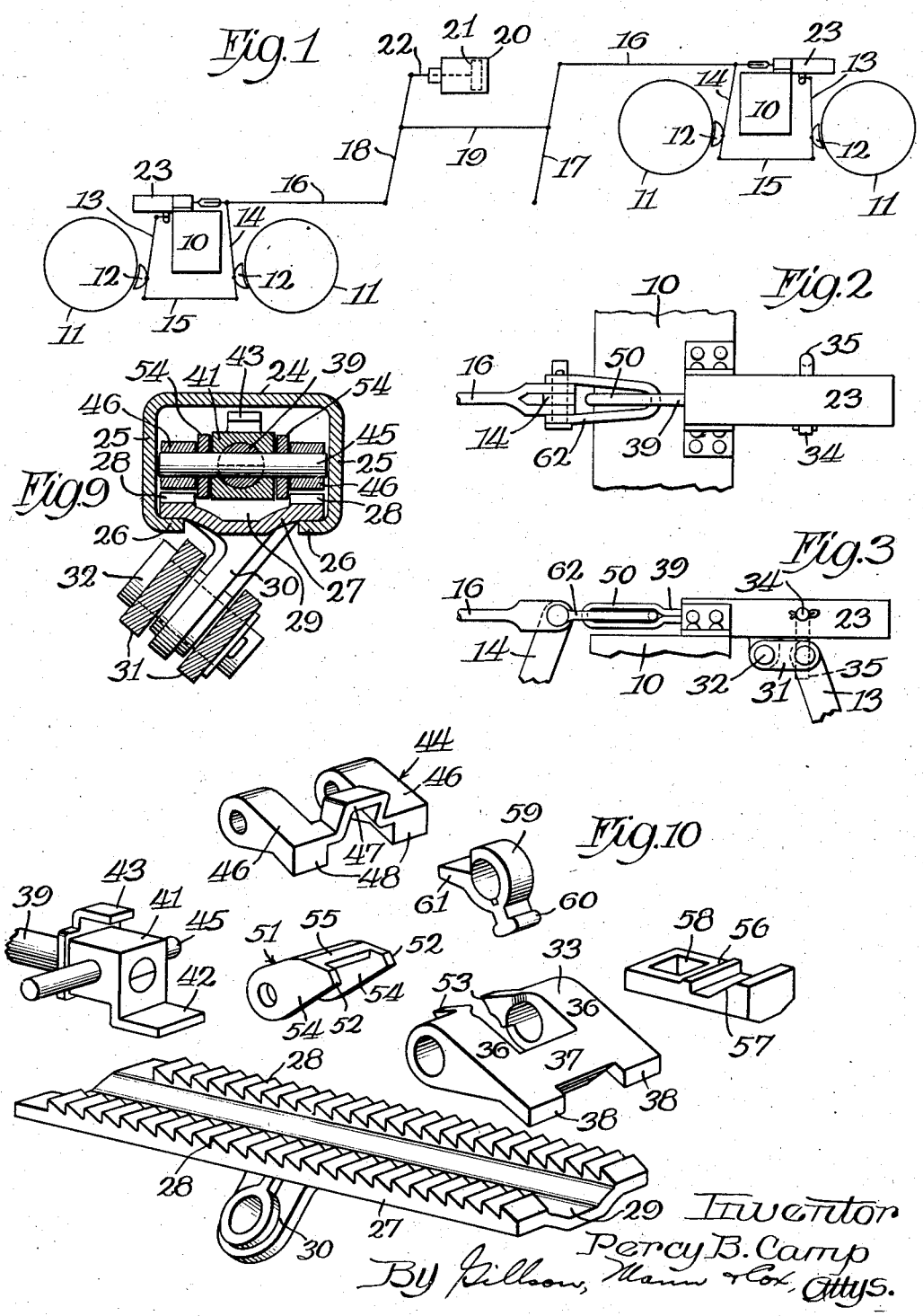

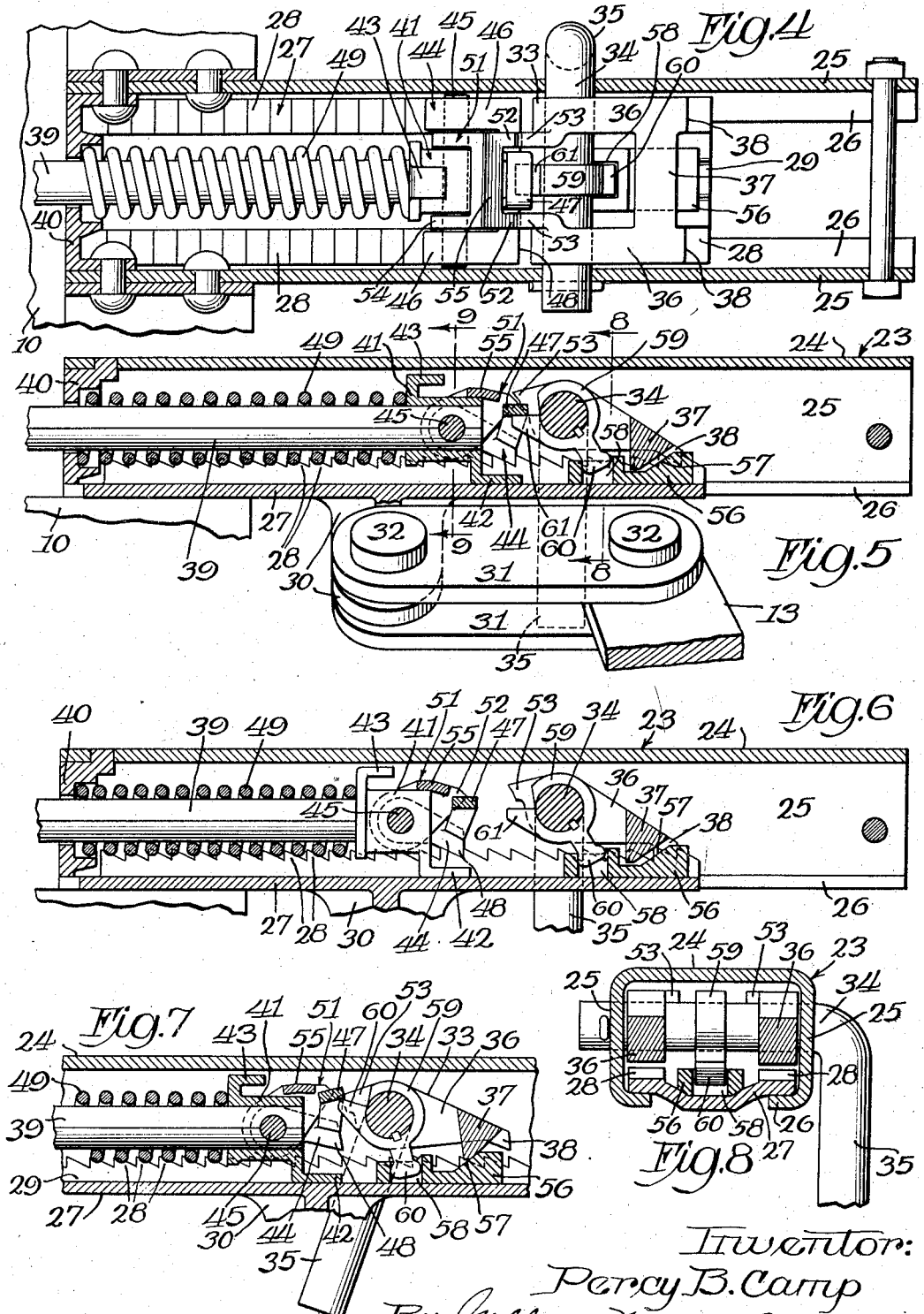

Patented June 30, 1931

1,812,256

UNITED STATES PATENT OFFICE

PERCY B. CAMP, OF MAYWOOD, ILLINOIS, ASSIGNOR TO UNIVERSAL DRAFT GEAR ATTACHMENT CO., A CORPORATION OF ILLINOIS

BRAKE SLACK ADJUSTER FOR RAILWAY CARS

Application filed January 17, 1929. Serial No. 333,047.

This invention relates to brake mechanism for railway cars; and has for its principal object to provide an adjusting mechanism that will not be disturbed by buffing shocks, and that will be reliable in operation.

Further objects and advantages of the invention will become apparent as the disclosure proceeds and the description is read in connection with the accompanying drawings, in which Fig. 1 is a diagram of a conventional freight car brake mechanism equipped with an adjuster made according to the invention and applied to the fulcra of the dead truck levers;

Fig. 2 is a plan view of the adjuster;

Fig. 3 is a side elevation of the same;

Figs. 4 and 5 are, respectively, horizontal and vertical sectional views through the adjuster;

Fig. 6 is a view similar to Fig. 5, showing the parts in the position they assume during adjustment;

Fig. 7 is a view similar to Fig. 5, showing the parts in the position they assume during release preparatory to the installation of new brake shoes;

Figs. 8 and 9 are transverse sectional views taken, respectively, on the lines 8—8 and 9—9 of Fig. 5; and Fig. 10 is a perspective view of the adjuster with the parts displaced to better show their form.

But this specific illustration and the correspondingly specific description are used for the purpose of disclosure only, and it is not intended to thereby impose limitations on the claims beyond what is made necessary by the prior art, for it is realized that the invention may be embodied in other forms and put to other applications and operated by hand.

In the diagram shown in Fig. 1, 10 indicates truck bolsters, 11 truck wheels, 12 brake shoes, 13 dead truck levers, 14 live truck levers, 15 bottom truck bars, 16 brake rods, 17 dead cylinder lever, 18 live cylinder lever, 19 cylinder lever connection, 20 brake cylinder, 21 brake piston, 22 push rod. Such brake mechanisms are too familiar to require any detail description.

It is obvious that by shifting the fulcra of the dead truck levers 13 outwardly or toward the ends of the car that compensation may be made for wear on the brake shoes 12, while shifting them in the opposite direction will permit the installation of new brake shoes. These functions are accomplished and permitted by the brake adjuster shown in detail in the remaining views of the drawings.

The base of the adjuster is a guide housing generally indicated by 23 in Figs. 1 to 3, which includes a top 24 (Figs. 8 and 9), sides 25, and bottom flanges or rails 26.

Within the housing, and riding on the rails 26, is a rack 27 (Fig. 10), having two sets of teeth 28 separated by a depressed track or way 29, and fitted at the bottom with a perforated arm 30, which is connected to the dead cylinder lever 13 by a shackle including links 31 (Fig. 5) and pins 32. A holding pawl 33 (Fig. 10) is pivoted on a shaft 34 (Figs. 7 and 8) extending through the sides 25 of the housing 23, and having one end 35 bent downwardly to form a handle. The pawl 33 is composed of two arms 36, connected by a cross-piece 37 near the toes 38, which engage the teeth 28.

An adjusting rod 39 (Figs. 4 to 6) extends through the head 40 into the housing, and is equipped with a head 41 having a downwardly and forwardly extending shoe 42, running on the track or way 29, and a forwardly extending slide 43 adapted to cooperate with the top 24 of the housing.

A driving pawl 44 (Fig. 10) is pivoted astride the head 41 on a rod 45, which pawl is also composed of two similar arms 46, connected by an arched cross-piece 47 adjacent to the toes 48, which engage the rack teeth 28 on the rack 27. A spring 49 encircles the rod 39 between the heads 40 and 41, and serves to keep the parts in the position shown in Figs. 4 and 5.

The adjusting rod is made from a piece of half round stock bent to form an elongated eye 50 (Fig. 3), and the ends are brought together in the head 41 and made fast by the cross pin 45.

A pawl lock 51 (Fig. 10) is also mounted astride the head 41 and pivoted on the bar 45, and has end portions 52 adapted to underlie the heels 53 on the holding pawl 33, as best shown in Fig. 5, to thereby prevent the holding pawl from being released by shocks caused by buffing. This lock 51 is composed of two arms 54, connected by a cross-piece 55.

A cam or wedge-block 56 (Fig. 10), provided with a lifting surface 57 and a socket 58, is mounted to slide upon the track or way 29 of the rack 27 and cooperate with the holding pawl, between the arms 36 of which the shaft 34 is equipped with a hub 59 (Fig. 10) having a downwardly extended arm 60 to cooperate with the socket 58, and a rearwardly extended arm 61 adapted to cooperate with the arched cross-piece 47 of the driving pawl 44.

The eye 50 of the adjusting rod 39 is connected with the brake rod 16 or the live truck lever 14 by a clevis 62 (Figs. 2 and 3). The eye 50 and the clevis 62 are of such proportions that normal brake shoe travel or piston travel may be had without disturbing the adjuster. Upon excess travel, however, the clevis 62 draws the eye 50, and therefore the adjusting rod 39, to the left in Figs. 4, 5 and 6. Such movement takes the pawl lock 51 away from the holding pawl, and therefore releases it for disengagement from the rack.

If the movement of the adjusting rod is sufficient, the driving pawl 44 will engage a tooth 28 of the rack 27 to the left of that which it had formerly engaged, and upon release of the brake mechanism the spring 49 will move the rod 39, and with it the head 41 and the driving pawl 44, to the right, shifting the rack 27 along the guide beneath the holding pawl 33. As the parts approach normal position, teeth 28 on the rack running under the toes 38, will rotate the pawl 33, and lower the heels 53 into the path of the end portions 52, and thus cause the pawl lock 51 to rotate counterclockwise until the holding pawl can drop into its seat between two of the teeth 28, when the lock will, by gravity, drop to the position shown in Fig. 5 and lock the holding pawl in place. A similar operation may be had by shifting the adjusting rod to the left manually and letting it return to the right.

When it becomes necessary to install new brake shoes the rack 27 must be released and the fulcra of the dead cylinder levers moved toward the bolsters 10. This is accomplished by shifting the arm 35 from the position shown in Fig. 5 to that shown in Fig. 7, which causes the arm 61 to engage the arched cross piece 47 of the driving pawl which, in turn, engages the pawl lock 51 and causes it to be released along with the driving pawl 44, and which shifting of the arm 35 also causes the arm 60 to move the cam or wedge 56 to the left in Fig. 7, bringing the surface 57 into contact with the inclined lower surface of the cross piece 37, and disengaging the holding pawl. This being accomplished the racks are readily shifted along the guides to the desired position.

I claim as my invention—

1. In a brake mechanism, a lever, a rack operatively connected with the lever, a relatively fixed guide for the rack, a holding pawl on the guide engaging the rack, an adjuster moving with respect to the guide upon excess brake movement, a spring resisting such movement of the adjuster and automatically restoring it upon release of the brakes, a driving pawl on the adjuster engaging the rack, and means operated by the adjuster for securing the holding pawl in engagement with the rack.

2. In a brake mechanism, a lever, a rack operatively connected with the lever, a relatively fixed guide for the rack, a holding pawl on the guide engaging the rack, and adjuster moving with respect to the guide upon excess brake movement, a spring resisting such movement of the adjuster and automatically restoring it upon release of the brakes, a driving pawl on the adjuster engaging the rack, a lock pivoted on the adjuster and securing the holding pawl in engagement with the rack.

3. In a brake mechanism, a lever, a rack operatively connected with the lever, a relatively fixed guide for the rack, a holding pawl on the guide engaging the rack, an adjuster moving with respect to the guide upon excess brake movement, a spring resisting such movement of the adjuster and automatically restoring it upon release of the brakes, a driving pawl on the adjuster engaging the rack, means operated by the adjuster for securing the holding pawl in engagement with the rack, and means for holding both pawls released from the rack.

4. In a brake mechanism, a lever, a rack operatively connected with the lever, a relatively fixed guide for the rack, a holding pawl on the guide engaging the rack, an adjuster moving with respect to the guide upon excess brake movement, a spring resisting such movement of the adjuster and automatically restoring it upon release of the brakes, a driving pawl on the adjuster engaging the rack, manually operated means for holding both the driving and holding pawls released, including a bell-crank lever and a wedge operated by the lever.

5. In a brake mechanism, a lever, a rack operatively connected with the lever, a relatively fixed guide for the rack, a holding pawl on the guide engaging the rack, an adjuster moving with respect to the guide upon excess brake movement, a spring resisting such movement of the adjuster and automatically restoring it upon release of the brakes, a driving pawl on the adjuster engaging the rack, and manually operated means for holding both the driving and holding pawls released including a wedge and a bell-crank lever having one arm controlling the wedge and another arm serving as a handle.

6. In a brake mechanism, a lever, a rack connected with the lever and having two sets of teeth separated by a track, a relatively fixed guide for the rack, a holding pawl on the guide engaging the rack, an adjuster, a pawl on the adjuster whereby it may move relatively to the rack in one direction but moves the rack with it in the opposite direction, and means operating between the sets of teeth to release the pawls.

7. In a brake mechanism, a lever, a rack operatively connected with the lever, a relatively fixed guide for the rack, a holding pawl on the guide engaging the rack, an adjuster, a pawl on the adjuster whereby it may move relative to the rack in one direction but moves the rack with it in the other direction, and means on the adjuster for securing the holding pawl in engagement with the rack.

8. In a brake mechanism, a lever, a rack operatively connected with the lever, a relatively fixed guide for the rack, a holding pawl on the guide engaging the rack, an adjuster, a driving pawl on the adjuster whereby the latter may move in one direction relative to the rack but will drive the rack when moved in the opposite direction, and a pivoted pawl lock on the adjuster to engage the heel of the holding pawl and hold it in engagement with the rack.

9. In a brake mechanism, a lever, a rack operatively connected with the lever, a relatively fixed guide for the rack, a holding pawl on the guide engaging the rack, an adjuster moving with respect to the guide upon excess brake movement, a spring resisting such movement of the adjuster and automatically restoring it upon release of the brakes, a driving pawl on the adjuster engaging the rack, and means for securing the holding pawl in engagement with the rack, said means being automatically released upon a given excess brake travel.

10. In a brake mechanism, a lever, a rack operatively connected with the lever, a relatively fixed guide for the rack, a holding pawl on the guide engaging the rack, an adjuster moving with respect to the guide upon excess brake movement, a spring resisting such movement of the adjuster and automatically restoring it upon release of the brakes, a driving pawl on the adjuster engaging the rack, and means for securing the holding pawl in engagement with the rack including a locking pawl adapted to bear against heels on the holding pawl.

11. An adjuster for a device of the class described comprising a rod, a head secured to the rod, a pivoted locking pawl astride the adjuster head, and a pivoted driving pawl astride the locking pawl and adjuster head, said locking pawl being supported in its normal position by a crosspiece on the driving pawl.

12. In a brake mechanism, a lever, a rack operatively connected with the lever and having two sets of teeth separated by a channel, a relatively fixed guide for the rack, a holding pawl on the guide engaging the rack, an adjuster moving to reset the rack upon excess brake travel, said adjuster including a head, a driving pawl astride the head, and a locking pawl normally resting upon the driving pawl in an upright angular position and engaging a portion of the holding pawl to lock the latter in engagement with the rack.

13. In a brake mechanism, a lever, a rack operatively connected with the lever and having two sets of teeth separated by a channel, a relatively fixed guide for the rack, a holding pawl on the guide engaging the rack, an adjuster moving to reset the rack upon excess brake travel, said adjuster including a head, a driving pawl astride the head, a locking pawl normally resting upon the driving pawl in an upright angular position and engaging a portion of the holding pawl to lock the latter in engagement with the rack, and manual means for releasing the three pawls including a wedge block and a bell crank lever, one arm of which lever operates the block to lift the holding pawl from the rack and another arm operating to disengage the driving and locking pawls.

In testimony whereof I affix my signature.

PERCY B. CAMP.